United States Patent
BuAbbud (10) Patent No.: US 6,460,182 B1
(45) Date of Patent: Oct. 1, 2002

(54) OPTICAL COMMUNICATION SYSTEM FOR TRANSMITTING RF SIGNALS DOWNSTREAM AND BIDIRECTIONAL TELEPHONY SIGNALS WHICH ALSO INCLUDE RF CONTROL SIGNALS UPSTREAM

(75) Inventor: George H. BuAbbud, Southlake, TX (US)

(73) Assignee: Marconi Communications, Inc., Cleveland, OH (US)

( * ) Notice: Subject to any disclaimer, the term of this patent is extended or adjusted under 35 U.S.C. 154(b) by 0 days.

(21) Appl. No.: 09/309,717

(22) Filed: May 11, 1999

(51) Int. Cl.[7] .............................. H04N 7/00; H04N 7/01
(52) U.S. Cl. ...................... 725/126; 725/106; 725/118; 725/121
(58) Field of Search ................... 359/113, 114; 348/11, 12, 13; 455/3.1, 5.1, 6.1, 6.2, 6.3; 725/105, 106, 118, 121, 126; H04N 7/00, 7/01

(56) References Cited

U.S. PATENT DOCUMENTS

| | | | |
|---|---|---|---|
| 5,351,148 A | * | 9/1994 | Maeda et al. ............... 359/132 |
| 5,680,238 A | * | 10/1997 | Masuda ....................... 359/132 |
| 5,742,414 A | | 4/1998 | Frigo et al. |
| 5,880,865 A | | 3/1999 | Lu et al. |
| 5,969,836 A | * | 10/1999 | Foltzer ....................... 359/114 |
| 6,031,645 A | * | 2/2000 | Ichikawa .................... 359/113 |

FOREIGN PATENT DOCUMENTS

EP    0690591 A1    1/1996

OTHER PUBLICATIONS

Masakazu Kitazawa, Masatoshi Yamazaki, Susumu Hiti, "Fiber–Optic Subscriber System Based on Passive Optical Network Architecture," Hitachi Review vol. 43 (1994). No. 2.

* cited by examiner

*Primary Examiner*—Andrew Faile
*Assistant Examiner*—Vivek Srivastava
(74) *Attorney, Agent, or Firm*—Jones, Day, Reavis & Pogue (57) ABSTRACT

A method of transmitting TV signals and bidirectional telephone communication signals on a single optical fiber, existing telephone twisted pair infrastructure, and existing coaxial cable infrastructure. In addition to allowing the downstream transmission of television channels as well as bidirectional telephone communication, the single optical fibers also provides for the upstream travel of television related signals while requiring minimal changes of the existing infrastructure.

16 Claims, 3 Drawing Sheets

OPTICAL COMMUNICATION SYSTEM FOR TRANSMITTING RF SIGNALS DOWNSTREAM AND BIDIRECTIONAL TELEPHONY SIGNALS WHICH ALSO INCLUDE RF CONTROL SIGNALS UPSTREAM

BACKGROUND OF THE INVENTION

1. Field of the Invention

The present invention relates to methods and apparatus for carrying on simultaneous communications over a single optical fiber by using two different operating frequencies, and more specifically to methods and apparatus for use with WDM (wave division multiplexing) at two different wavelengths of light to provide bidirectional telephonic communication using TDM (time division multiplexing) at one wavelength of light and transmitting TV signals down stream only at another wavelength. TV control signals are returned by the telephonic communication path to the TV source by multiplexing the control signals with the telephonic signals.

2. Description of Relating Art Including Information Disclosed Under 37 CFR 1.97 and 1.98

The communications industry is using more and more optical or light fibers in lieu of copper wire. Optical fibers have an extremely high bandwidth thereby allowing significantly more information than can be carried by a copper wire transmission line such as twisted pairs or coaxial cable.

Of course, modern telephone systems require bidirectional communications where each station or user on a communication channel can both transmit and receive. This is true, of course, whether using electrical wiring or optical fibers as the transmission medium. Early telephone communication systems solved this need by simply providing separate copper wires for carrying the communications in each direction, and this approach is still used in part of the transmission path. It is especially used as the signals get closer to the end users. Although twisted pairs and coaxial cables are used in homes and distribution terminals close to the home end user, some modern telecommunication systems now use micro-wave and optic fibers as transmission mediums. In addition TCM (time compression multiplexing) is often used in optical transmission so that a signal optical fiber can carry communications in both direction.

However, because of extremely high band widths available for use by an optical fiber, a single fiber is quite capable of carrying a great number of communications in both directions. One technique of optical transmission is WDM (wavelength divisional multiplexing) and uses different wavelengths for each direction of travel.

Yet another and simpler technique for using a single optical fiber for telephone systems is TCM (time compression multiplexing) and is sometimes referred to as a "ping-pong" system. The system operates at a single frequency or wavelength of light and uses a single optical fiber and often even a single diode, for both converting electrical signals to optical signals and converting received optical signals to electrical signals. TCM systems have the obvious advantage of requiring fewer components.

However, as mentioned above, optical fibers have extremely high band widths and use of an optical fiber for a single ping-pong telephone channel is a very ineffective use of the fiber and, in fact, the available bandwidth of an optical fiber makes it possible to use a transmission technique such as TCM or ping-pong at one frequency and then by the use of WDM technology to use another technique at a second frequency.

Another area of rapidly growing technology is providing unidirectional TV signals by cable to a multiplicity of subscribers or users. In the past, such signals were and still are typically transmitted by the use of coaxial cables (e.g. cable TV). However, the use of optical fibers for transmission allows broad band transmission to a large numbers of customers and, since substantially all of the transmission of TV signals is one way (i.e. unidirectional), if a single optical fiber were used solely for the TV signals there would be almost no use of the selected wavelength of light for carrying return signal, which are typically control or information signals.

Therefore, a technique for transmitting bidirectional telephonic signals and unidirectional TV signals would make efficient use of an optical fiber.

It would also be advantageous to provide return control signals to the TV signal source or station with respect to each customer or subscriber without having to dedicate a frequency or wavelength of light full time to said seldom used or RF Return transmitted signals.

SUMMARY OF THE INVENTION

The above objects and advantages are achieved in the present invention by methods and apparatus which comprise transmitting light at a first wavelength to carry telephonic signals between a first telephone-related device and a second telephone-related device, or location and also transmitting light at a second wavelength to carry TV signals from a TV signal source to an end user(s). The wavelengths or light are carried through a single optical fiber from a first-end to a second-end. The first and second wavelengths of light are received at the second-end of the optical fiber, and the signals on the first wavelength of light are detected and converted to first electrical signals at a first frequency band suitable for carrying telephonic signals such as voice telephone and computer modem signal, at a freqence of about 64 KHz. The received second wavelength of light is also detected, and the detected light is converted to electrical signals, within a second frequency band, typically between 5 and 800 MHZ and are representative of TV channel signals. The telephonic electrical signals are transmitted to a receiving telephone or other telephone-related device and the electrical signals representative of TV signals are transmitted to a TV signal receiving device. The return electrical telephonic signals are then generated at the receiving telephone-related device at the same frequency band the original telephonic signal were transmitted and are representative of return telephone information which could be modem information or voice information. TV related electrical signals such as control signals, information signals or TV show ordering signals are also generated at a third frequency band. The return electrical telephonic signal at the first frequency band of about 64 HKz and the TV related electrical signal generated at about 5 to 50 MHZ are multiplexed together. The multiplexed electrical signals are converted to light signals at the first wavelength and carry both the return telephonic signal and the TV related signal. The light at the first wavelength is transmitted through the single optical fiber from the second end to the first end where it is received and detected such that electrical signals representative of the return telephonic signals and the electrical signal representative of the TV related information are generated. The return electrical telephonic signals are transmitted to the first telephone-related device and the electrical TV related signals are transmitted to the TV signal source.

BRIEF DESCRIPTION OF THE DRAWINGS

These and other features of the present invention will be more fully disclosed when taken in conjunction with the following Detailed Description of the Preferred Embodiment(s) in which like numerals represent like elements and in which.

DETAILED DESCRIPTION OF THE PREFERRED EMBODIMENT(S)

Figure 1:
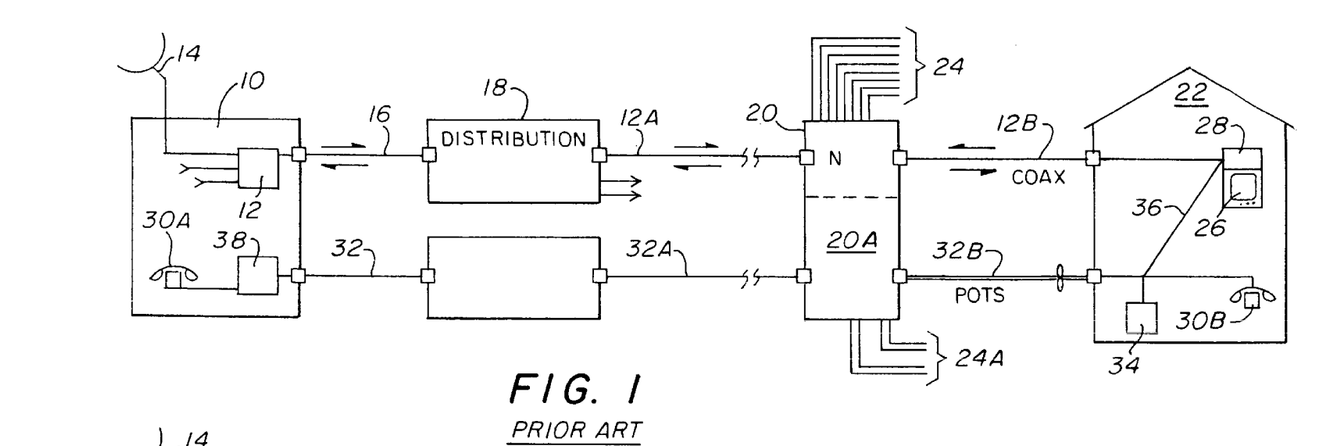
FIG. 1 is a prior art block diagram showing the present transmission and distribution of a typical coaxial TV and POTS telephone system.

Referring now to FIG. 1, there is shown a typical transmission and distribution system for cable TV and normal telephone service, referred to as POTS (plain old telephone service). As shown, cable TV source location 10 has cable TV transmission equipment 12 which may originate from several sources including a satellite receiver 14. The TV equipment 12 would then amplify this signal and send it out typically on a coaxial line such as line 16 to a distribution system which may include several stations such as station 18 where the signal is again amplified and further distributed to an even larger multiplicity of locations. Such re-amplification and further distribution may occur several times but eventually will arrive at a local distribution terminal 20 by means of a coaxial cable 12A from which it is then distributed to a home or building 22 by a coaxial cable 12B. As shown distribution terminal 20 may also provide TV signals to other buildings or homes such as indicated by bracket 24. Once the TV signal is received at building 22, it will then typically be provided to a TV set 26 directly or to a set-top or cable TV box 28. If the signal is first provided to the set-top box 28, it is then directly provided to TV set 26. It should be appreciated that the direction of travel for such signals is primarily unidirectional and downstream. That is, it travels primarily from the cable TV signal source 10 to the set-top box 28 in the building or home 22 at frequencies of between 50–800 MHZ. If information is to be carried upstream or back to source 10, it will typically be at between 50–200 MHZ.

Also shown is a typical telephone system or POTS which of course is two-way communication typically carried by means of a twisted pair of wires. In the example shown in FIG. 1, if someone at the cable TV signal source location 10 wishes to talk with someone at building 22, the telephone 30A is used in its normal manner. The two-way conversation is carried on between the person in building 10 using telephone 30A and by a person using telephone 30B in the home or building 22. This communication is typically carried through a pair of twisted wires such as indicated by 32, 32A, and 32B. In recent years, the regular telephone distribution system has also been used to provide communications between computers. This is done by the use of a modem 34 which connects a computer to the telephone line. As was the case with the TV signal distribution, there are typically several stations or substations between the two telephones 30A and 30B located at the building 10 and the building 22, respectively. Such distribution terminals or stations allow telephone services between all subscribers with which we are all well aware. However, as shown at distribution terminal 20A, there may also be several other buildings or homes connected to distribution terminal 20A as indicated by bracket 24A. As was discussed earlier, communications between buildings 10 and 22 were typically accomplished through regular telephone service by individuals talking to each other. However with more efficient automation, telephone lines may also be connected up to the set-top box 28 as indicated by wires 36. In addition, in the distribution terminal 38 at the cable TV signal location, there is also a telephone connection to the TV signal equipment 12, such that it is now possible that movies or information concerning the TV signals and TV equipment can be communicated between the two locations.

Figure 2:
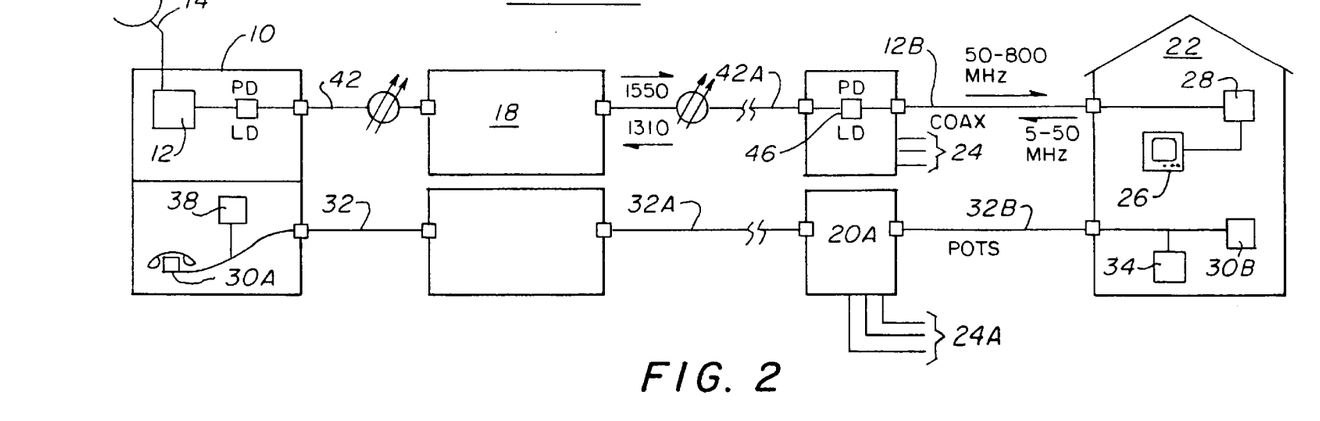
FIG. 2 shows a POTS telephone system and a fiber optic TV distribution system having 1550 nanometer light carrying TV signals in one direction and 1310 nanometers of light carrying telephonic signals in both directions.

As demands increase for more and more TV channels and better and more efficient transmission techniques without disruption and interference, the long runs of coaxial cable are simply becoming inefficient and inadequate. Thus as is shown in FIG. 2, there is an improved system for the transmission of TV signals between the TV signal source location 10 and the building or home 22. In the systems shown in FIG. 2, there is also shown a standard telephone or POTS system as discussed above.

In the improved television transmission system, however, the transmission is achieved by a fiber optical cable as indicated by fiber optical cables 42 and 42A. As shown in FIG. 2, the same coaxial cable 12B exist between the distribution terminal 20 and the home or building 22. However, also as shown distribution terminal 20 includes new equipment 46 which receives the transmitted light on fiber optic 42 and converts it to electrical signals and conversely receives electrical signals from 12B and converts the electrical signals to light signals for transmission on fiber optic 42A. However as will be appreciated by those skilled in the art, the TV signals from the TV signal source building 10 normally travel downstream only and are continuous. Thus, if bidirectional communications between the cable TV signal source 10 and the distribution terminal 20 are to take place, some sort of sharing of the individual fiber optic 42A as well as the copper wire 12B must be provided. Thus, in the example shown, the TV signals travel in a single direction (i.e., downstream) from the TV signal source at location 10 to the home or building 22 by light waves having a length of at 1550 nanometers. Any return communication traveling on optical fibers 42 and 42A must be carried at a different wavelength of light such as 1310 nanometers which travels upstream to the TV signal source location 10. Likewise, if bidirectional communication is to take place on the single coaxial cable 12B between distribution terminal 20 and home or building 22, the transmission of such bidirectional communication transmission will be at different frequencies. Thus, in the illustrated example, the 1550 nanometer light waves will be converted to electrical signals having a frequency band of between about 50 and 800 MHZ which travel in a single direction from distribution terminal 20 to the home or building 22. The return signals from the set or set-top box at building 22 are then carried at about 5 to 50 MHZ back to the distribution terminal 20 and then used to modulate light waves having a wavelength of 1310 nanometers. Thus, it is seen that it is possible by the use of a single fiber optic cable as well as using existing infrastructure copper wiring such as coaxial cable to transmit a broad frequency band of TV signals carrying multiple channels of TV information at one wavelength of light. The individual TV channels are then converted to electrical signals at a specific frequency within the 50–800 MHZ frequency band. Conversely, electrical control signals within the 5–50 MHZ frequency band are converted to light at a wavelength different from that provided in the downstream mode and transmitted back to the TV signal source location 10. The return wavelength of light in the illustrated example is 1310 nanometers.

Figures 3, 4A:
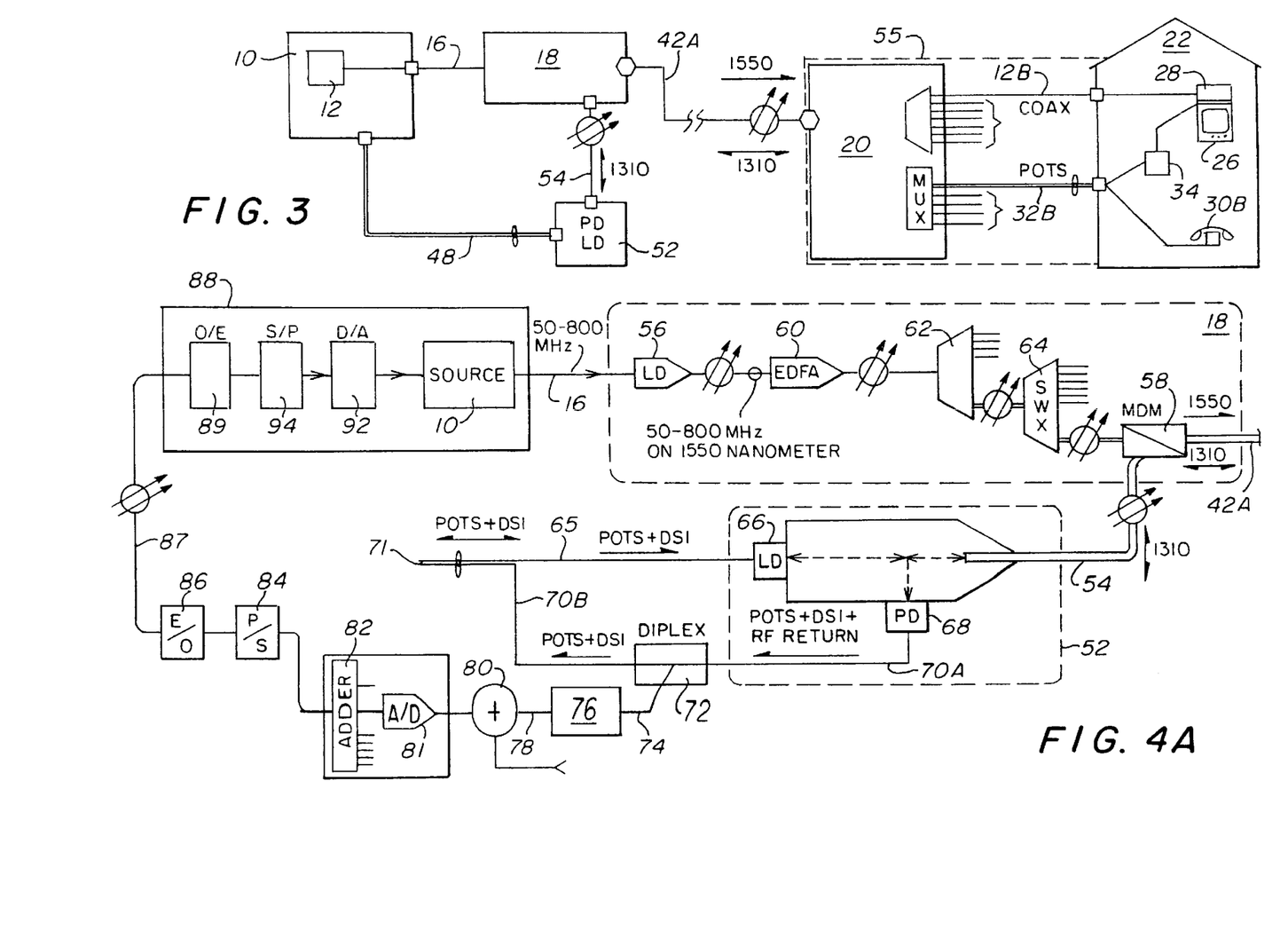
FIG. 3 shows a block diagram of a preferred embodiment of the present invention incorporating portions of the existing POTS telephone system and the coaxial TV signal distribution system while using a single optical fiber for carrying the TV signals at 1550 nanometers of light downstream and the telephonic signals in both directions at 1310 nanometers.
FIGS. 4A and 4B show detailed block diagram of the invention of FIG. 3.

Referring now to FIG. 3 there is shown a simplified block diagram of the preferred embodiment of the present invention which takes partial advantage of the existing telephone and coaxial TV distribution systems while also using a single optical fiber 42A for part of the transmission path between the TV signal source location 10 and the building or home 22. It should be noted that, although the following discussion is in terms of a single path for the coaxial or optical fiber cable between two locations 10 and 22, in actuality there may be a significant amount of multiplexing and de-multiplexing such that many, many subscribers or customers may be serviced by the single optical fiber and any other multiplexed cable. It should also be noted that there may also be several amplification stations located at various locations in the distribution path. As shown, TV signal source location 10 provides signals from equipment 12 and, in this illustrated embodiment, the TV signals may be 50 to 800 MHZ signals provided on copper wire, such as coaxial cable 16. Copper coaxial cable 16 carries the TV signals having a band width of 50 to 800 MHZ to a distribution terminal 18 which converts the electrical TV signals to light signals having a selected wavelength. In one preferred embodiment a particular selected wavelength is 1550 nanometers. Thus the light waves travel in a single direction from distribution terminal 18 or distribution terminal 20. Also as shown, electrical telephonic signals may be carried by copper wires such as copper wires 48 which represent a twisted pair of normal telephone communication wires to a substation 52 where electrical telephonic signals traveling in one direction are converted to light signals at a selected frequency and light signals at that same frequency traveling in the opposite direction are converted to electrical telephonic signals. Thus, the fiber optic cable 54 shown between distribution terminals 18 and 52 carries telephonic signals at a single wavelength of light typically selected to be about 1310 nanometers. The light signals at 1310 nanometers are able to travel in both directions on the single fiber optic cable 54 by the use of TCM (time compression multiplexing). Although TCM is not normally suitable for higher density signals such as TV signals, it is quite adequate for lower frequencies suitable for transmitting the human voice as well as frequencies up to about 50 to 64 KHz, which is above human hearing. Time compression multiplexing simply stated means that time is broken up in substantially two portions or cycles such that signals travel in one direction during one portion and in the opposite direction during the other portion. Thus, distribution terminal 18 receives fiber optic cable 54 carrying the 1310 TCM (time compression multiplexed) modulated light and also receives 50 to 800 MHZ TV signals from the TV signal source location 10. The 50 to 800 MHZ electrical signals are converted to light signals having a wavelength of 1550 nanometers. Thus, distribution terminal 18 also combines by WDM (wave division multiplexing) the 1310 nanometer signals with the 1550 nanometer signal such that cable 42A carries 1550 nanometer signals in a downstream direction and carries 1310 nanometer telephonic signals in both directions.

At distribution terminal 20, and as will be discussed in detail later, the 1550 nanometer downstream traveling signals are then reconverted to electrical TV signals having a band width of between 50 and 800 MHZ. They are then distributed to various locations including home or building 22 as was discussed with respect to FIGS. 1 and 2 above. In a similar manner, the bidirectional TCM signals traveling on 1310 nanometer light waves are routed to other equipment in distribution terminal 20 which converts the 1310 nanometer light waves into electrical telephonic signals and converts electrical telephonic signals into light waves having a wavelength of 1310 nanometers. The electrical telephonic signals are then distributed from distribution box 20 by twisted wiring 32B to the telephone 30B or other telephonic equipment such as the computer modem 34 at home or building 22.

As was discussed with respect to the system of FIG. 2 above, it may be desirable to transmit certain types of television related control signals or "purchasing information" signals from the set-top box 28 or TV set 26 at building 22 back to the TV signal source location 10. As discussed earlier with respect to FIG. 2, such return information will have to be carried upstream at a different frequency band such as 5–50 MHZ, on the copper cable 12B and on a wavelength different than 1550 nanometer on fiber optic cable 42A. Thus, in addition to the telephone service which travels on a wavelength of light of 1310 nanometers, distribution terminal 20 will also convert the 5 to 50 MHZ electrical TV related signals to light signals having a wavelength of 1310 nanometers. These light signals carrying the return TV related signals are then multiplexed with the telephone service also traveling at 1310 nanometers and the portion on the TCM cycle traveling from distribution terminal 20 to distribution terminal 18. At distribution terminal 18, the TV related control signals can be provided through fiber optic cable 1310 to distribution box 52 where they are converted to telephone electrical signals and then provided in a normal fashion to the TV equipment 12 or alternately distribution terminal 18 may split out the 5 to 50 MHZ signals from the 1310 wavelength of light and provide the signal on coaxial cable 16 which is carrying the downstream original television signals having frequency bands of 50 to 800 MHZ. These 5–50 MHZ signals traveling upstream go to the TV equipment 12.

Although in the embodiment shown in FIG. 3, the conversion between light waves and electrical signals for both telephone service and for TV signals is shown occurring at a remote distribution box 20, it will be appreciated that in the future it may be advantageous that a single fiber optic would be connected into a home or building 22 and the conversion from electrical signal to light signals and vice versa will take place in the building 22 itself as indicated by dotted line 55.

Thus, there has been discussed to this point generalized concepts for a new and improved telephonic and TV signal distribution systems.

Figure 4B:
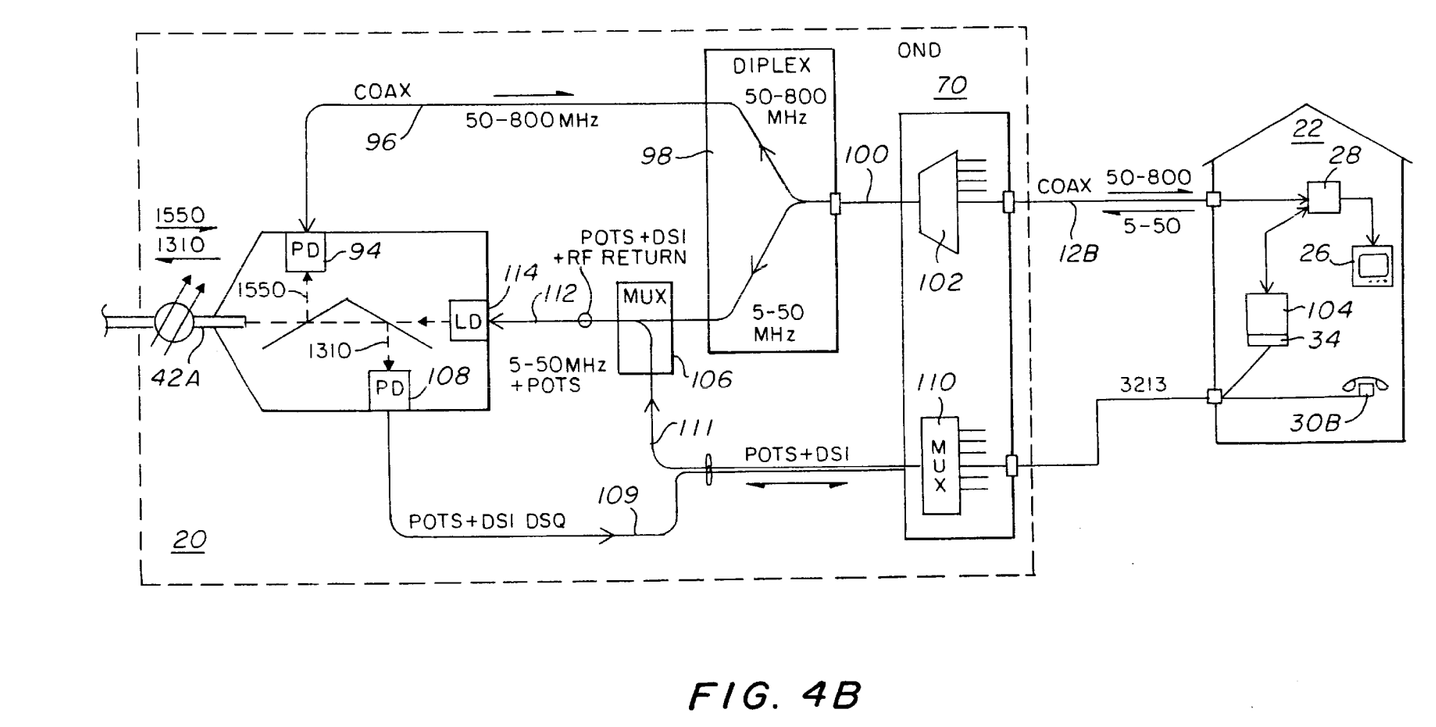

Referring now to FIGS. 4A and 4B, there is provided a more detailed description of the system of FIG. 3 discussed above. As shown, the TV signal source location 10 provides output TV signals at 50 to 800 MHZ traveling downstream on copper wire 12. The electrical signals are then provided to laser diode 56 where the electrical signal at 50 to 800 MHZ are then used to modulate light having a wavelength of 1550 nanometers. The 1550 nanometer light is then eventually provided to a wave division multiplexer 58 which is also connected to optical fiber 54 carrying light at a wavelength of 1310 nanometers and will be discussed later. Although it is possible that the output of the light emitting diode 56 could be provided directly to a wave division multiplexor 58, typically the light would go through a light amplifier such as EDFA (erbium doped fiber amplifier) 60. The amplified light signal from amplifier 60 would then pass the light through a first light splitting circuit 62 and then again perhaps to another light splitting circuit 64 such as a SWX circuit. The output of the splitter 64 would then be provided to WDM 58. As shown, the output of WDM 58 is connected to light fiber 42A.

Also as shown, multiplexed telephone service POTS at the DSI level (i.e. information from up to 24 telephone customers) on copper wire 65 is provided to distribution box 52 wherein the electrical telephonic signals typically having a frequency band up to about 60 MHZ are provided to another laser diode 66. These electrical signals are then converted by laser diode 66 to light signals having a wavelength of 1310 nanometers. This light is provided to optical fiber 54 as shown. As was discussed earlier, telephone service is typically TCM (time compression multiplexing) so as to provide for bidirectional communication at a single wavelength of light. Therefore as shown, light traveling upstream and leaving optical fiber 54 is directed toward a photo or a light detection diode 68 which receives the light and converts the 1310 nanometer light to telephonic signals having a frequency of about 60 KHz or less. Thus, the input electrical signal to laser diode 66 from line 65 on the output electrical signal from light detector 68 on line 70B actually represents a typical pair of twisted wires 71 used in normal POTS telephonic service. In the embodiment shown, the output telephonic signals on line 70A is first provided to a duplex circuitry 72 where the TV related control signals from the customer are split out on line 74 and the regular telephonic communications such as voice and computer modem server continues on output line 70B. The 5–50 MHZ on line 74, is then provided to a band pass filter circuit 70 which will only pass the 5–50 MHz, and which has an output 78 provided to a combining circuitry 80 which receives other similar signals from other TV customers up to a total of at least 16 (8+8) customers. The output of combining circuitry 80 is then provided to an 8 bit 90 MSPS (megsamples per second) analog-to-digital converter 81. The digital signals from A/D converter 81 are then provided to a 90 MHZ 8 bit to 12 bit adder 82. Adder 82 as shown can receive the output from 8 A/D converters such as A/D converter 82. Thus, it will be appreciated that the output from adder 82 going to the parallel to serial converter 84 will be carrying information related to at least 128 TV customers (16×8). The output of the P/S converter 84 may then provided to another E/O (electrical-to-optical) device 86 operating at 1 Gbps (giga bit per second). This output may then be transmitted by optical fiber 87 to CMTS (cable modem transmission source) at location 88 where the TV signal source 10 is also located. The light traveling through optical fiber 87 is then received by O/E (optical-to-electrical) converter 89 and the resulting electrical signals are provided to S/P (serial-to-parallel) converter 90. This parallel digital information is then provided to D/A converter 92, which in turn provides an analog signal to the TV signal source 10. This analog signal may of course be a control signal or other information related to a specific TV customer or subscriber.

Referring now to FIG. 4B, optical fiber 42A is shown being received at distribution panel 20. As shown optical fiber 42A is carrying television signals in one direction downstream by light having a wavelength of 1550 nanometers at the same time it carries bidirectional telephone communications using TCM (time compression multiplexing) by light having a wavelength of 1310 nanometers. As shown, the fight having a wavelength of 1550 nanometers is directed towards a photo detector 94 which converts this light to electrical television signals having a band width of between 50 and 800 MHZ These electrical television signals are then provided by coaxial cable 96 to a diplex circuit 98 which has an output 100 provided to splitting circuit 102. Also as shown and as will be discussed hereinafter diplex circuit 98 also separates out electrical signals having a frequency of between 5 and 50 MHZ traveling in the opposite direction. One of the outputs of splitter or distribution circuit 102 carrying the 50 to 800 MHZ electrical signals will then be provided to building or house 22 by means of coaxial cable 12B in the manner previously discussed. The television signals on coaxial cable 12B are then either provided to TV set 20 or to another TV-signal using device such as set-top box 28, and then to TV set 26. Also, in the building 22 there is shown a computer 104 connected to a computer modem 34 as was discussed heretofore with respect to FIG. 1 and which is also connected to the standard telephone lines or POTS lines 32B. Also as shown, a telephone 30B is connected to the POTS lines 32B. The RF return or TV related signals sent back to the TV source location 10 may result from several sources. One possible source is for the set-top box 28 to sense that the television signals being received need to be either decreased or increased in amplitude or strength. Alternately, it may be that the customer or user of the television decides to purchase a particular pay-on-demand movie. Still another source of information may be an input from the computer 104 provided to the set-top box carrying information or requesting information. Such information must be provided back to the TV source location 10. Set-top box 28 will convert the information into an electrical signal having a frequency band of between 5 and 50 MHZ which is inserted on coaxial cable 12B and transmitted to distribution terminal 20. It will be appreciated that coaxial cable 12B can carry information in both directions if the frequency band for the two directions is sufficiently separated. The 5–50 MHZ television related signals are then routed to the diplex circuitry 98 where the electrical signals having a frequency band of 5 to 50 MHZ are split out and provided to another combining multiplexing circuit 106.

Now referring again to the input cable 42A which, in addition to carrying light having a wavelength of 1550 nanometers as was previously discussed, is also carrying light at 1310 nanometers for the bidirectional telephone communication using TCM (time compression multiplexing). Thus, the light having a wavelength of 1310 nanometer is split and provided to a photo detector 108 which converts the 1310 nanometer light traveling downstream to telephonic electrical signals which travel on wires 109. These telephonic electrically signals will typically be POTS signals at the DS1 (up to 24 customers) or DS2 (up to 96 customers) level and are provided to the multiplexer 110 and eventually by means of wires 32B to the telephone circuitry in house or building 22. It should be appreciated that the wire 32B connecting home 22 to the distribution panel 20 is a normal twisted pair of telephone wires. The upstream traveling POTS service travels on wire 111 to multiplex circuit 106 where it is combined with the 5 to 50 MHZ signals and provided on output line 112 to a laser diode 114. Laser diode 114 then converts the electrical signals carrying the 5 to 50 MHZ television related signals as well as the telephonic signals to light having a wavelength of 1310 nanometers which light is then coupled again to fiber optic 42A. Thus, as was discussed earlier, the fiber optic 42A carries the upstream traveling 1310 nanometer light to distribution panel 18 where it is split out for both telephonic service and television related signal service.

Thus, there has been discussed to this point a new and novel communication transmission system using a single optical fiber as part of the communication path along with parts of an existing telephone communication system and parts of an existing cable TV distribution system.

The corresponding structures, materials, acts, and equivalents of all means or step plus function elements in the claims below are intended to include any structure, material, or act for performing the function in combination with other claimed elements as specifically claimed.

I claim:

1. A method of providing TV signals and bidirectional telephonic communications to a multiplicity of subscribers through a single optical fiber comprising the steps of:

transmitting light at a first wavelength carrying telephonic signals downstream from a first plurality of telephone related devices and at a second wavelength carrying TV signals downstream from a TV signal source through an optical fiber from a first end to a second end;

receiving said first wavelength of light and generating first electrical signals within a first frequency band and representative of said plurality of telephonic signals;

receiving said second wavelength of light and generating second electrical signals within a second frequency band and representative of said TV signals;

transmitting said telephonic electrical signals to a plurality of telephone related devices and said second electrical signals to a plurality of TV signal receiving devices;

generating a plurality of upstream or return electrical telephonic signals at said first frequency band representative of return telephonic information and a plurality of return or upstream TV related electrical signals at a third frequency band representative of TV related information from said plurality of subscribers;

multiplexing said electrical signals carrying said return telephonic signals at said first frequency band and said TV related electrical signals carrying said TV related information at said third frequency band;

receiving said multiplexed electrical signals and generating light at said first wavelength representative of said return telephonic signals and said TV related information;

transmitting light at said first wavelength to carry said return telephonic signals and said TV related information through said optical fiber from said second end to said first end;

receiving said light carrying said return telephonic signals and said TV related information and generating a plurality of third electrical signals representative of said return telephonic signals and a plurality of fourth electrical signals representative of said TV related information; and transmitting said third electrical signals to said first plurality of telephone related devices and said fourth electrical signals to said TV signal source.

2. The method of claim 1 wherein said first wavelength of light is 1310 nanometers and said second wavelength of light is 1550 nanometers.

3. The method of claim 1 wherein said highest frequency of said first frequency band is less than about 60 KHz.

4. The method of claim 3 wherein said third frequency band is between about 5 and about 50 MHZ.

5. The method of claim 4 wherein said second frequency band is between about 50 MHZ and about 800 MHZ.

6. A method of communicating comprising the steps of:

transmitting light at a first wavelength carrying first information from a first source and a second wavelength carrying second information from a second source through an optical fiber from a first end to a second end;

receiving said first wavelength of light and generating first electrical signals at a first frequency band and representative of said first information;

receiving said second wavelength of light and generating second electrical signals at a second frequency band and representative of said second information;

transmitting said first electrical signals to a first device and said second electrical signals to a second device;

generating third electrical signals at said first frequency band representative of third information and fourth electrical signals at a third frequency band representative of fourth information;

multiplexing said third electrical signals and said fourth electrical signals;

receiving said multiplexed electrical signals and generating light at said first wavelength representative of said third and fourth information;

transmitting light at said first wavelength carrying said third and fourth information through said optical fiber from said second end to said first end;

receiving said light carrying said third and fourth information and generating fifth electrical signals representative of said third information and sixth electrical signals representative of said fourth information; and transmitting said fifth electrical signals to said first source and said sixth electrical signals to said second source.

7. Communication signal transmission apparatus for carrying unidirectional TV signals downstream from a source to a first user and for carrying TCM (time compression modulation) bidirectional telephonic signals between said first user and a second user comprising;

an optical fiber suitable for simultaneously carrying two distinct wavelengths of light by WDM (wave division multiplexing) between a first location and a second location;

conversion apparatus located at said second location and connected to said optical fiber, said conversion apparatus converting optical signals at said first wavelength of light and carrying said unidirectional TV signals to electrical TV signals at a first frequency, converting optical signals at said second wavelength of light and carrying the downstream portion of said TCM bidirectional telephonic signals to electrical telephonic signals, and converting upstream electrical telephonic signals to TCM bidirectional telephonic optical signals at said second wavelength of light;

a first electrical conductor for receiving and carrying TV signals at said first frequency from said second location downstream to a TV signal user device;

TV related signals at a second frequency generated by said TV signal user device connected to said first electrical conductor and transmitted from said TV signal user device at said second location upstream to said second location;

a pair of electrical conductors for receiving and carrying said bidirectional telephonic signals between said second location and a first user device;

a multiplexer for combining said upstream TV related signals and the upstream portion of said bidirectional telephonic signals transmitted by said pair of electrical conductors to produce said electrical telephonic signals which are converted to optical signals at said second wavelength of light by said conversion apparatus;

a TV signal source;

second conversion apparatus located at said first location connected to said optical fiber for converting electrical signals from said TV signal source to downstream optical signals at said first wavelength of light and upstream optical signals at said second wavelength of light to electrical signals;

an electrical connection between said second conversion apparatus and said TV signal source for transmitting said upstream TV related signals to said TV signal source; and a second telephonic signal user device connected to said second conversion apparatus for sending and receiving said bidirectional telephonic signals.

8. A method of providing first signals within a first frequency band from a first location to a multiplicity of second locations, bidirectional telephonic signals within a second frequency band between said first location and at least one of said multiplicity of said second locations, and control signals related to said first signals within a third frequency band from said at least one second location to said first location all along a single optical path and comprising the steps of:

transmitting light at a first wavelength carrying said first signals having said first frequency band from said first location to at least one of said multiplicity of second locations on an optical path;

bidirectionally transmitting light at a second wavelength for carrying bidirectional telephonic signals modulated at a frequency within said second frequency band on said optical path between said first location and said at least one second location;

further modulating said transmitted light of said second wavelength traveling from said second location to said first location with said control signals related to said first signals having a third frequency band; and receiving said control signals having a third frequency band at said first location.

9. In a communication system providing signals from a source to a multiplicity of users a method of providing a return signal to said source from at least one of said multiplicity of users comprising the steps of:

transmitting light at a first wavelength for carrying signals within a first frequency band from said source at least part way to said multiplicity of users, wherein said signals within said first frequency band are RF signals having a frequency of between 50 and 900 MHz;

bidirectionally transmitting light at a second wavelength between the location of said source and said at least part way to one of said multiplicity of users, said bidirectional light at said second wavelength being modulated by bidirectional signals within a second frequency band; and further modulating said transmitted light at said second wavelength traveling from said second location to said location of said source with return signals related to said signals within said first frequency band and having a third frequency band.

10. In a communication system providing signals from a source to a multiplicity of users, a method of providing a return signal to said source from at least one of said multiplicity of users comprising the steps of:

transmitting light at a first wavelength for carrying signals within a first frequency band from said source at least part way to said multiplicity of users;

bidirectionally transmitting light at a second wavelength between the location of said source and said at least part way to one of said multiplicity of users, said bidirectional light at said second wavelength being modulated by bidirectional signals within a second frequency band; and further modulating said transmitted light at said second wavelength traveling from said second location to said location of said source with return signal related to said signals with said first frequency band and having a third frequency band, wherein said signals within said third frequency band are RF signals between 5 and 50 MHz.

11. The method of claim 9 wherein said third frequency band are RF return signals having a frequency of between 5 and 50 MHZ.

12. In a communication system providing signals from a source to a multiplicity of users, a method of providing a return signal to said source from at least one of said multiplicity of users comprising the steps of:

transmitting light at a first wavelength for carrying signals within a first frequency band from said source at least part way to said multiplicity of users;

bidirectionally transmitting light at a second wavelength between the location of said source and said at least part way to one of said multiplicity of users, said bidirectional light at said second wavelength being modulated by bidirectional signals within a second frequency band; and further modulating said transmitted light at said second wavelength traveling from said second location to said location of said source with return signal related to said signals with said first frequency band and having a third frequency band, wherein said bidirectional signals within said second frequency band are telephony signals, said signals within said first frequency band are RF signals, said signals within said third frequency band are RF return signals; and receiving said RF return signals at said source location.

13. Communication apparatus comprising:

a source for generating signals at a first frequency band and adapted for distribution to a multiplicity of users;

a transmission path between a first location having said source and at least one of said multiplicity of users at a second location, at least a portion of said transmission path being optical;

a first light generator for generating light at a first wavelength of light and adapted for carrying said signals of said first frequency band from said source at said first location to said second location on said optical portion of said transmission path;

a pair of second light generators one each of said pair located at each end of the optical portion of said transmission path and each for generating light at a second wavelength and adapted for carrying bidirectional telephonic signals having a second frequency band traveling between said first and second locations on said optical portion of said transmission path; and a return signal having a third frequency band generated at the location of said at least one of said multiplicity of users and carried partially to said source of said first location by said optical portion of said transmission path by light having said second wavelength.

14. A method of providing first signals within an RF frequency band from a first location to a multiplicity of second locations, bidirectional telephony signals within a second frequency band between said first location and at least one of said multiplicity of said second locations, and signals related to said first signals within a third frequency band from said at least one second location to said first location all at least partially along a single optical path and comprising the steps of:

transmitting light at a first wavelength modulated by said first signals via said optical path from said first location to an intermediate location and from said intermediate location to said at least one of said multiplicity of second locations on a first path having at least two electrical conductors;

bidirectionally transmitting light at a second wavelength modulated by telephony signals within said second frequency band via said optical path between said first location and said intermediate location and further transmitting said telephony signals from said intermediate location to said second location on a second path having at least two electrical conductors;

transmitting said signals related to said first signals at selected frequencies within said third frequency band from said at least one of said second locations to said intermediate location on said first path;

further modulating said transmitted light having said second wavelength traveling from said intermediate location to said first location with said transmitted signals related to said first signals and having said third frequency band; and receiving said signals related to said first signals and having said third frequency band at said first location.

15. The method of claim 14 wherein said signals within said first frequency band are RF signals having a frequency of between 50 and 800 MHz.

16. The method of claim 14 wherein said second RF signals within said third frequency band are RF signals between 5 and 50 MHZ.

* * * * *